(12) United States Patent
Bress et al.

(10) Patent No.: US 11,902,622 B2
(45) Date of Patent: Feb. 13, 2024

(54) METHODS, SYSTEMS, AND APPARATUSES FOR DETERMINING VIEWERSHIP

(71) Applicant: COMCAST CABLE COMMUNICATIONS, LLC, Philadelphia, PA (US)

(72) Inventors: Robert Alan Bress, New Providence, NJ (US); Christopher Paul Whitely, Summit, NJ (US); Zhao Xing, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 189 days.

(21) Appl. No.: 16/886,367

(22) Filed: May 28, 2020

(65) Prior Publication Data

US 2021/0377611 A1 Dec. 2, 2021

(51) Int. Cl.
*H04N 21/466* (2011.01)
*H04N 21/45* (2011.01)
*H04N 21/442* (2011.01)
*G06N 3/08* (2023.01)
*G06N 3/06* (2006.01)
*G06N 7/01* (2023.01)

(52) U.S. Cl.
CPC ......... *H04N 21/4666* (2013.01); *G06N 3/061* (2013.01); *G06N 3/08* (2013.01); *G06N 7/01* (2023.01); *H04N 21/44204* (2013.01); *H04N 21/4524* (2013.01); *H04N 21/4667* (2013.01)

(58) Field of Classification Search
CPC .......... G06N 20/00; G06N 3/08; G06N 7/005; G06N 3/0445; G06N 5/022; H04L 67/22; H04N 21/4532; H04N 21/4668; H04N 21/25891; H04N 21/4667; H04N 21/44222; H04N 21/251; H04N 21/252; H04N 21/4826
See application file for complete search history.

(56) References Cited

U.S. PATENT DOCUMENTS

| | | | |
|---|---|---|---|
| 8,924,993 B1 * | 12/2014 | Niebles Duque | H04N 21/25883 725/9 |
| 2009/0024546 A1 * | 1/2009 | Ficcaglia | G06Q 30/02 706/46 |
| 2016/0165277 A1 * | 6/2016 | Kirillov | H04N 21/25883 725/14 |
| 2016/0269766 A1 * | 9/2016 | Levande | H04N 21/6582 |
| 2017/0324996 A1 * | 11/2017 | Thaker | H04N 21/4662 |
| 2017/0357890 A1 * | 12/2017 | Kim | G06N 3/084 |
| 2018/0189660 A1 * | 7/2018 | Malmi | G06N 5/04 |

(Continued)

*Primary Examiner* — Jason Salce
(74) *Attorney, Agent, or Firm* — Ballard Spahr LLP

(57) ABSTRACT

Methods, systems, and apparatuses for determining viewership of a content item are described herein. Machine learning techniques may be used to determine which user(s) among a user group at a multi-user location is consuming a content item. A machine learning model may be trained using demographic attributes and content attributes associated with a plurality of single-user locations. A probability engine may train a machine learning model using the demographic attributes and content attributes and one or more machine learning algorithms. The trained machine learning model may be used to determine which user(s) among at least two users is consuming a content item at a multi-user location at which multiple people reside.

20 Claims, 8 Drawing Sheets

(56) References Cited

U.S. PATENT DOCUMENTS

| | | | |
|---|---|---|---|
| 2018/0260857 A1* | 9/2018 | Kar | G06Q 30/0254 |
| 2019/0208272 A1* | 7/2019 | Hattery | H04N 21/858 |
| 2019/0373332 A1* | 12/2019 | Kim | H04N 21/4751 |
| 2020/0204862 A1* | 6/2020 | Miller | H04N 21/4668 |
| 2020/0267449 A1* | 8/2020 | Hoffman | H04N 21/25891 |
| 2021/0174381 A1* | 6/2021 | Cui | H04N 21/251 |

* cited by examiner

METHODS, SYSTEMS, AND APPARATUSES FOR DETERMINING VIEWERSHIP

BACKGROUND

Determining information related to identity of individuals consuming content can be valuable and useful for various applications. While techniques for determining identity of content viewers exist, issues remain with accuracy and validity. For example, determining who is consuming a content item at a user location may be straightforward when it is known that only one user resides at the user location. On the other hand, determining who is consuming a content item at a multi-user location at which multiple people reside is a more difficult task. As a result, providing user-specific secondary content in real-time for a given user at a multi-user location is not easily accomplished. These and other considerations are addressed by the present description.

SUMMARY

It is to be understood that both the following general description and the following detailed description are exemplary and explanatory only and are not restrictive. Methods, systems, and apparatuses for determining viewership of a content item are described herein. Machine learning techniques may be used to determine which user(s) among a user group at a multi-user location is consuming a content item. For example, a machine learning model may be trained using two datasets. A first dataset may include demographic attributes for each user associated with one of a plurality of single-user locations. A computing device may receive the first dataset and provide the demographic attributes to a probability engine. The second dataset may include content metadata for each of a group of content items that were previously presented at the plurality of single-user locations. The content metadata for a content item may include one or more content attributes associated with the content item. The computing device may receive the second dataset and provide the one or more content attributes to the probability engine.

Using the first dataset and the second dataset, the probability engine may determine a training dataset. The training dataset may include one or more demographic attributes selected from the first dataset (e.g., age, gender, and/or the like) as well as one or more content attributes selected from the second dataset (e.g., a genre, a review score, a production year, and/or the like). The probability engine may train the machine learning model using the training dataset and one or more machine learning algorithms.

The trained machine learning model may be used to determine which user(s) is consuming a content item among at least two users at a multi-user location at which multiple people reside. For example, the trained machine learning model may be used to determine an initial probability of viewership of the content item, such as an initial probability score, for each of the at least two users. The probability engine may receive network data associated with the multi-user location at or near a date/time at which the content item was consumed at the multi-user location.

The network data may include user device wireless network data associated with one of the at least two users, natural language processing data received at a user device associated with one of the at least two users, account activity data for a user device associated with one of the at least two users, a combination thereof, and/or the like. The probability engine may use the network data to determine an adjusted probability of viewership of the content item. The probability engine may receive validation data associated with the at least two users and the content item. The validation data may be determinative of which user(s) of the at least two users actually consumed the content item. The probability engine may use the adjusted probability of viewership of the content item and/or the validation data to retrain the trained machine learning model.

The computing device may provide the user(s) of the at least two users that actually consumed the content item with user-specific secondary content based on the adjusted probability of viewership and/or the validation data. For example, the user(s) of the at least two users that actually consumed the content item may be an adult female viewer. The user-specific secondary content may be one or more of a content item recommended by other adult female viewers, a commercial, a coupon, a website link, an invite to review the content item consumed, a combination thereof, and/or the like.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein.

DETAILED DESCRIPTION

Figure 1:
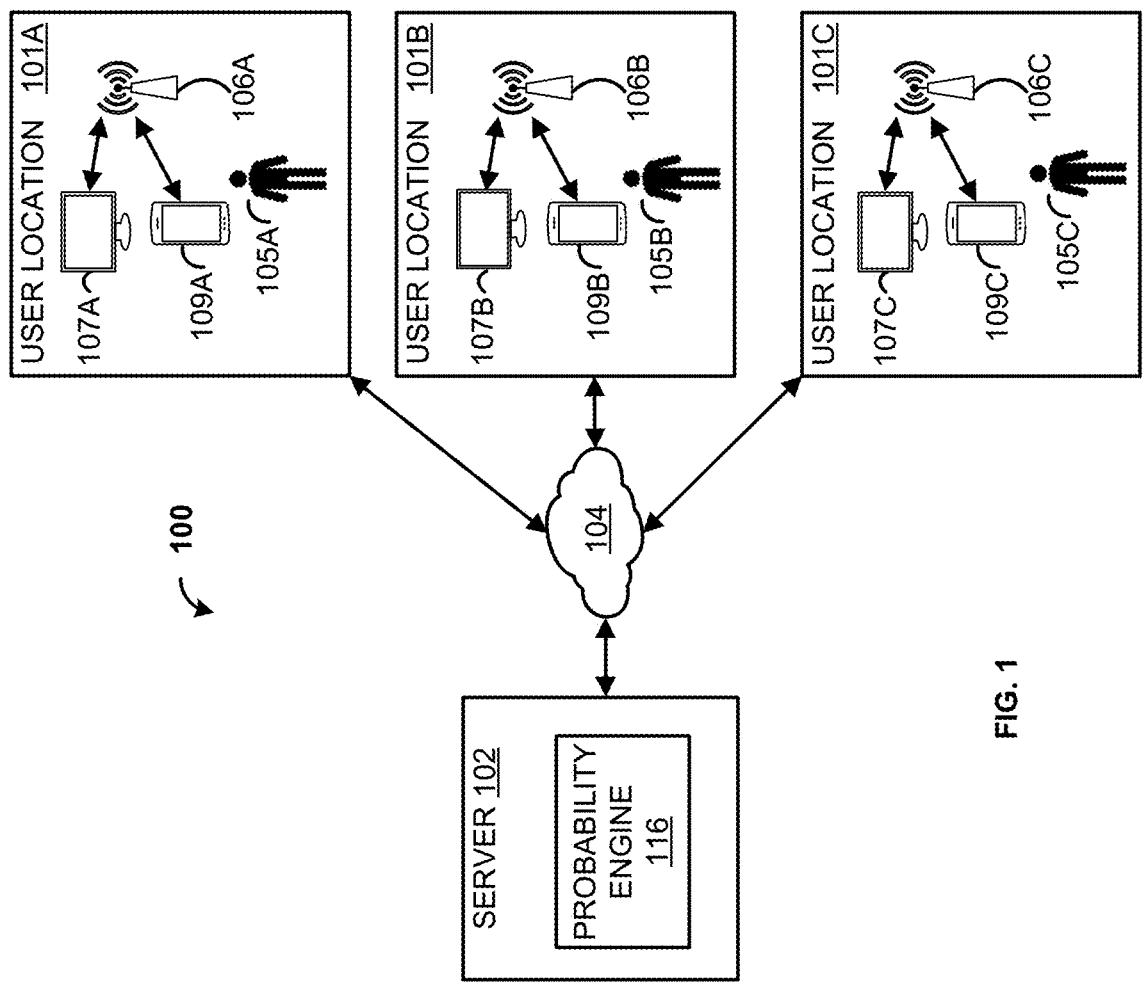
FIG. 1 shows a block diagram of an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, NonVolatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Methods, systems, and apparatuses for determining viewership of content items are described herein. In some examples, machine learning techniques may be used to determine which user(s) among a user group at a multi-user location is consuming a content item. A machine learning model may be trained using a training dataset. The training dataset may include a first dataset and a second dataset. The first dataset may include demographic attributes for each user associated with one of a plurality of single-user locations. A computing device may receive the first dataset and provide it to a probability engine. The second dataset may include content metadata for each of a group of content items that were previously presented at the plurality of single-user locations. The content metadata for a content item may include one or more content attributes associated with the content item. The computing device may receive the second dataset and provide it to the probability engine.

Using the first dataset and the second dataset, the probability engine may determine a training dataset. The training dataset may include one or more demographic attributes selected from the first dataset. For example, the one or more demographic attributes selected from the first dataset may include viewer age and/or age group (e.g., 18-34, 25-54, etc.). As another example, the one or more demographic attributes selected from the first dataset may include viewer gender. The training dataset may include the one or more demographic attributes selected from the first dataset as well as one or more content attributes selected from the second dataset (e.g., a genre, a review score, a production year, and/or the like). Each content attribute may include a plurality of values. For example, the plurality of values for a content attribute "genre" may be "horror," "romance," "comedy," and "action." The probability engine may train the machine learning model using the training dataset and one or more machine learning algorithms. For example, the machine learning model may be a neural network having a plurality of neurons. Each neuron of the neural network may be associated with a content attribute of the one or more content attributes and a demographic attribute of the one or more demographic attributes.

For each of the plurality of neurons, the probability engine may generate a distribution of probability scores (e.g., percentages) for the demographic attribute with respect to each value of the content attribute. For example, the demographic attribute may be "male." The distribution of probability scores may indicate a percentage of males among the training dataset for each type of "genre." The content attribute may be "genre," having values of "horror," "romance," "comedy," and "action." The distribution of probability scores may indicate that 50% of content consumed by males is categorized by the content metadata as having a "genre" value of "comedy." The distribution of probability scores may indicate that 5% of content consumed by males is categorized by the content metadata as having a "genre" value of "romance." The distribution of probability scores may indicate that 30% of content consumed by males is categorized by the content metadata as having a "genre" value of "horror." Finally, the distribution of probability scores may indicate that 15% of content consumed by males is categorized by the content metadata as having a "genre" value of "action." While percentages are used herein, it is to be understood that the use of percentages is exemplary only. Other expressions/representations may be used, such as ratios, fractions, ranges, letters, a combination thereof, and/or the like.

The trained machine learning model may be used to determine which user(s) among at least two users is consuming a content item at a multi-user location at which multiple people reside. For example, the trained machine learning model may be used to determine an initial probability of viewership of the content item, such as an initial probability score, for each of the at least two users. The initial probability score for each of the at least two users may be based on one or more of the distribution of probability scores generated by the probability engine. The one or more distribution of probability scores may be selected by the machine learning model based on a common demographic attribute shared among the user(s) associated with the one or more distribution of probability scores and one or more of the at least two users (e.g., a common gender and/or a common age group).

The probability engine may receive network data associated with the multi-user location at or near a date/time at which the content item was consumed. The network data may include user device wireless network data associated with one of the at least two users. For example, the user device wireless network data may indicate the user device was logged into a wireless network at the multi-user location during at least a portion of time the content item was consumed. The network data may include natural language processing data received at a user device associated with one of the at least two users. For example, the natural language processing data may be received at a voice-enabled user device, such as a remote control, a tablet, a mobile device, etc. The voice-enabled user device may be used to control a computing device that presents the content item (e.g., receive voice commands to control playing of the content item). The network data may include account activity data for a user device associated with one of the at least two users. For example, the account activity data may indicate a specific user account sent a request for the content item. The network data may also include data related to facial recognition. For example, a user of a user device at the multi-user location may opt-in to facial recognition services offered by the user device (e.g., to customize content presented, allow access to the user device, etc.). The network data may further include interaction data associated with a user's interactions with a user device at the multi-user location (e.g., responses to on-screen prompts).

The probability engine may use the network data to determine an adjusted probability of viewership of the content item. The probability engine may receive validation data associated with the at least two users and the content item. The validation data may be determinative of which user(s) of the at least two users actually consumed the content item. For example, the validation data may be based on a survey completed by the at least two users (e.g., a consumer panel, an online survey, a telephone survey, etc.). The probability engine may use the adjusted probability of viewership of the content item and/or the validation data to retrain the trained machine learning model. For example, the adjusted probability of viewership of the content item and/or the validation data may be provided to the probability engine. The probability engine may use the adjusted probability of viewership of the content item and/or the validation data to adjust the distribution of probability scores for "gender" with respect to each value of "genre."

Turning now to FIG. 1, a block diagram of an example system 100 for determining viewership of a content item is shown. The system 100 may include a server 102 and a plurality of user locations 101A, 101B, 101C each in communication with the server 102 via a network 104. The server 102 may include a probability engine 116. Each of the plurality of single-user locations 101A, 101B, 101C may include a user 105A, 105B, 105C, at least one gateway device 106A, 106B, 106C (e.g., a router, access point, etc.), at least one computing device 107A, 107B, 107C (e.g., set-top box, laptop, desktop, smart TV, etc.), and at least one user device 109A, 109B, 109C (e.g., laptop, mobile phone, tablet, etc.).

The probability engine 116 may collect/aggregate demographic attributes for each user 105A, 105B, 105C, such as a gender and/or an age of each user 105A, 105B, 105C. Additionally, or in the alternative, the probability engine 116 may receive the demographic attributes for each user 105A, 105B, 105C from a database containing one or more of credit reporting data, census data, or survey data. The probability engine 116 may collect/aggregate content metadata for each of a group of content items that were previously presented at the plurality of single-user locations 101A, 101B, 101C. For example, each content item may have associated content metadata. The content metadata may include one or more content attributes, such as one or more of a genre, a review score, a production year, an actor(s), an actress(es), indication of live vs. non-live, an indication of the content item being a premiere vs. a repeat, and/or the like. Each content attribute may include a plurality of values. For example, the plurality of values for a content attribute "genre" may be "horror," "romance," "comedy," and "action." Additionally, or in the alternative, the probability engine 116 may receive the content metadata for each of the group of content items from a database containing historical viewing data for the plurality of single-user locations 101A, 101B, 101C (e.g., billing record, set-top box data, etc.).

Figure 2:
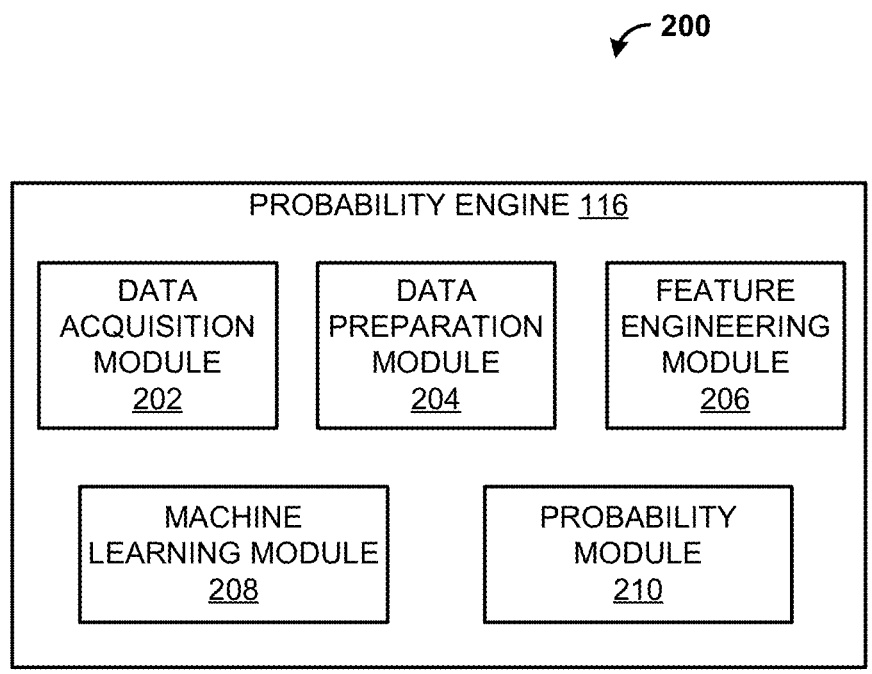
FIG. 2 shows a block diagram of an example system module.

FIG. 2 shows an expanded block diagram of the probability engine 116 of FIG. 1. The probability engine 116 may implement one or more machine learning techniques to determine which user(s) among a user group at a multi-user location is consuming a content item. The probability engine 116 may include a data acquisition module 202 that may be configured to receive the demographic attributes for each user 105A, 105B, 105C and the content metadata for each of the group of content items that were previously presented at the plurality of single-user locations 101A, 101B, 101C. For example, each content item may have associated content metadata. The content metadata may include one or more content attributes, such as one or more of a genre, a review score, a production year, and/or the like. Each content attribute may include a plurality of values. For example, the plurality of values for a content attribute "genre" may be "horror," "romance," "comedy," and "action." Additionally, or in the alternative, the probability engine 116 may receive the content metadata for each of the group of content items from a database containing historical viewing data for the plurality of single-user locations 101A, 101B, 101C (e.g., billing record, set-top box data, etc.).

The demographic attributes for each user 105A, 105B, 105C and the content metadata for each of the group of content items received/retrieved by the data acquisition module 202 may require cleaning/preparation in order to be more useful when training a machine learning model. The probability engine 116 may include a data preparation module 204 that may be configured for initial cleaning of the demographic attributes for each user 105A, 105B, 105C and the content metadata for each of the group of content items. The data preparation module 204 may be configured to generate intermediate data staging and temporary tables in a database of the data preparation module 204. For example, the data preparation module 204 may pair each of the demographic attributes for each user 105A, 105B, 105C with each content attribute of the content metadata. The data preparation module 204 may store each pairing in a different table in the database.

The data preparation module 204 may standardize the demographic attributes and the content attributes of the content metadata. For example, one or more of the demographic attributes or the content attributes of the content metadata may include be in a first format or structure while one or more other demographic attributes or the content attributes of the content metadata may be in another format or structure. The data preparation module 204 may standardize the demographic attributes and the content attributes of the content metadata by converting the demographic attributes and the content attributes into a common format/structure.

The probability engine 116 may include a feature engineering module 206 that may be configured to prepare the demographic attributes and the content attributes of the content metadata for input into a machine learning module 208 of the probability engine 116. The feature engineering module 206 may generate a data point for each demographic attribute using all corresponding content attributes of the content metadata. A given data point for a given demographic attribute may be referred to as a "vector" of demographic data that represents all content attributes of the content metadata that are associated with the given demographic attribute. As another example, the feature engineering module 206 may clean the demographic attributes and the content attributes of the content metadata by removing duplicate records/occurrences in each.

As discussed herein, the data preparation module 204 may pair each of the demographic attributes for each user 105A, 105B, 105C with each content attribute of the content metadata, and the data preparation module 204 may store each pairing. The feature engineering module 206 may eliminate any pairing that is present within the data less than a threshold amount of times. For example, a pairing having 10 or fewer occurrences within the data may not contribute significantly towards determining how strongly correlated a given demographic attribute is with a particular content attribute. The feature engineering module 206 may eliminate any pairing having a demographic attribute associated with a user of a single-user location that is not commonly shared with users of multi-user locations.

The feature engineering module 206 may be further configured to perform feature engineering. The feature engineering module 206 may generate new independent variables/features or modify existing features that can improve a determination of how strongly correlated a given demographic attribute is with a particular content attribute. The feature engineering module 206 may eliminate feature calculations that do not have significant effect. For example, the demographic attributes and the content attributes of the content metadata may be analyzed according to additional feature selection techniques known in the art to determine one or more demographic attributes/features that have a significant effect when determining how strongly correlated the one or more demographic attributes/features are with a particular content attribute.

Any suitable computational technique may be used to identify the one or more demographic attributes/features using any feature selection technique such as filter, wrapper, and/or embedded methods. For example, the one or more demographic attributes/features may be selected according to a filter method, such as Pearson's correlation, linear discriminant analysis, analysis of variance (ANOVA), chi-square, combinations thereof, and the like. As another example, the one or more demographic attributes/features may be selected according to a wrapper method configured to use a subset of features and train a machine learning model using the subset of features. Based on inferences that may be drawn from a previous model, features may be added and/or deleted from the subset. Wrapper methods include, for example, forward feature selection, backward feature elimination, recursive feature elimination, combinations thereof, and the like. As a further example, the one or more demographic attributes/features may be selected according to an embedded method that may combine the qualities of the filter and wrapper methods. Embedded methods include, for example, Least Absolute Shrinkage and Selection Operator (LASSO) and ridge regression which implement penalization functions to reduce overfitting.

The probability engine 116 may include a machine learning module 208 and a probability module 210. The probability engine 116 may train a machine learning model using the machine learning module 208 and a training dataset. The training dataset may include a first dataset and a second dataset. The first dataset may include the demographic attributes for each user 105A, 105B, 105C. The second dataset may include the content metadata for each of the group of content items that were previously presented at the plurality of single-user locations 101A, 101B, 101C. The machine learning module 208 may be configured to utilize a machine learning model(s) to analyze the training dataset and to determine how strongly correlated each demographic attribute is with each content attribute.

The machine learning module 208 may take empirical data as an input and recognize patterns within the data. As an example, the empirical data may be the first dataset and the second dataset discussed herein. The machine learning model may include probability scores that are optimized by the machine learning module 208 for minimizing a cost function associated with the machine learning model given the input demographic attributes for each user 105A, 105B, 105C and the content metadata for each of the group of content items that were previously presented at the plurality of single-user locations 101A, 101B, 101C. For instance, in the context of determining how strongly correlated a demographic attribute is with a content attribute, the machine learning model may separate the content attributes into various classes (e.g., labels) each associated with a demographic attribute. The cost function may consider a number of misclassified points of the content attributes. The misclassified points may be a plurality of the content attributes that the machine learning model incorrectly classifies as being associated with one or more demographic attributes. A learning process of the machine learning model may be employed by the machine learning module 208 to adjust coefficient values for the parameters such that the number of misclassified points is minimal. After this optimization phase (e.g., learning phase), the machine learning model may be used to classify new data points for a test of data.

The machine learning module 208 may employ one or more supervised, unsupervised, or semi-supervised machine learning models. Generally, supervised learning entails the use of a training set of labels that may be used to train the machine learning model to apply the labels to the input data. Unsupervised techniques, on the other hand, do not require a training set of labels. While a supervised machine learning model may determine whether previously seen patterns in a training dataset have been correctly labeled in a testing dataset, an unsupervised model may instead determine whether there are sudden changes in values of the plurality of data points. Semi-supervised machine learning models take a middle ground approach that uses a greatly reduced set of labeled training data, as known in the art.

The machine learning module 208 may employ one or more machine learning algorithms such as, but not limited to, a Bayesian inference algorithm; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic or other regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The machine learning module 208 may include any number of machine learning models to perform the techniques herein, such as for cognitive analytics, predictive analysis, and/or trending analytics, as known in the art.

The machine learning module 208 may be a neural network. Neural networks are computational tools capable of machine learning. In neural networks interconnected computation units known as neurons are allowed to adapt to training data, and the neurons subsequently work together to produce predictions in a model that to some extent resembles processing in biological neural networks. Neural networks may comprise a set of layers, the first layer being an input layer configured to receive an input, such as the content attributes described herein. The input layer may include one or more neurons that are connected to one or more neurons in a second layer, which may be referred to as a hidden layer. The one or more neurons of the hidden layer may be connected to a further hidden layer, or an output layer. In some neural networks, each neuron of a layer has a connection to each neuron in a following layer. Such neural networks are known as fully connected networks.

The training data in a fully connected network may be used to let each connection to assume a weight that characterizes a strength of the connection (e.g., between demographic attributes and content attributes). Some neural networks include both fully connected layers and layers that are not fully connected. Fully connected layers in a neural network may be referred to as densely connected layers. In some neural networks, signals propagate from the input layer to the output layer strictly in one way, meaning that no connections exist that propagate back toward the input layer. Such neural networks are known as feed forward neural networks. In cases where connections propagate back toward the input layer, the neural network in question may be referred to as a recurrent neural network.

As discussed herein, the machine learning module 208 may be configured to train a machine learning model that may be used to determine how strongly correlated a given demographic attribute is with a particular content attribute. The machine learning module 208 may receive the first dataset including the demographic attributes for each user 105A, 105B, 105C. The machine learning module 208 may receive the second dataset including the content metadata for each of the group of content items that were previously presented at the plurality of single-user locations 101A, 101B, 101C.

When training the machine learning model, the machine learning module 208 may evaluate several machine learning algorithms using various statistical techniques such as, for example, accuracy, precision, recall, F1-score, confusion matrix, receiver operating characteristic ("ROC") curve, and/or the like. The machine learning module 208 may also use a Random Forest algorithm, a Gradient Boosting algorithm, an Adaptive Boosting algorithm, K-Nearest Neighbors algorithm, a Naïve Bayes algorithm, a Bayesian inference algorithm, a Logistic Regressor Classifier, a Support Vector machine, a combination thereof and/or the like when training the machine learning model.

Gradient Boosting may add predictors to an ensemble classifier (e.g., a combination of two or more machine learning models/classifiers) in sequence to correct each preceding prediction (e.g., by determining residual errors). The K-Nearest Neighbors algorithm may receive each data point within the training dataset data and compare each to the "k" closest data points. An Adaptive Boosting classifier may attempt to correct a preceding classifier's predictions by adjusting associated weights at each iteration. The Support Vector Machine may plot data points within the training dataset in n-dimensional space and identify a best hyperplane that separates the performance metrics indicated by the training dataset into two groups. Logistic Regression may be used to identify an equation that may best estimate how strongly correlated a given demographic attribute is with a particular content attribute as a function of a feature vector of the training dataset. A Gaussian Naïve Bayes algorithm may be used to determine a boundary between the two groups of the training dataset based on Bayesian conditional probability theorem. A Random Forest Classifier may include a collection of decision trees that are generated randomly using random data sampling and random branch splitting (e.g., in every tree in the random forest), and a voting mechanism and/or averaging of outputs from each of the trees may be used to determine whether a given demographic attribute is strongly correlated with a particular content attribute.

The machine learning module 208 may select one or more machine learning models to generate an ensemble classifier (e.g., an ensemble of one or more classifiers). Selection of the one or more machine learning models may be based on each respective models' F-1 score, precision, recall, accuracy, and/or confusion metrics (e.g., minimal false positives/negatives). For example, the ensemble classifier may use Random Forest, Gradient Boosting Machine, Adaptive Boosting, Logistic Regression, and Naïve Bayes models. The machine learning module 208 may use a logistic regression algorithm as a meta-classifier. The meta-classifier may use respective predictions of each model of the ensemble classifier as its features to make a separate determination of whether a given demographic attribute is strongly correlated with a particular content attribute.

The machine learning module 208 may train the ensemble classifier based on the training dataset. For example, the machine learning module 208 may train the ensemble classifier to predict results for each pairing of a demographic attribute and a content attribute. The predicted results may include soft predictions, such as one or more predicted results, and a corresponding likelihood of each being correct. For example, a soft prediction may include a value between 0 and 1 that indicates a likelihood that a person with a given demographic attribute will consume a content item having a given content attribute, with a value of 1 being a prediction with 100% accuracy and a value of 0.5 corresponding to a 50% likelihood. The machine learning module 208 may make the predictions based on applying the features engineered by the feature engineering module 206 to each pairing of a demographic attribute and a content attribute.

The meta-classifier may be trained using the predicted results from the ensemble classifier along with the corresponding pairings of demographic attributes and content attributes within the training dataset. For example, the meta-classifier may be provided with each pairing of demographic attributes and content attributes and the corresponding prediction from the ensemble classifier. The meta-classifier may be trained using the prediction from each classifier that is part of the ensemble classifier along with the corresponding combinations of variables.

The meta-classifier may be trained to output improved predictions that are based on the resulting predictions of each classifier of the ensemble classifier based on the same variables. The meta-classifier may then receive a testing dataset that includes demographic attributes and content attributes for a testing set of data, and the meta-classifier may predict whether a given demographic attribute is strongly correlated with a particular content attribute based on the variables indicated by the demographic attributes and the content attributes of the testing dataset. The prediction by the meta-classifier that is based on the ensemble classifier may include one or more predicted results along with a likelihood of accuracy of each prediction.

As discussed herein, the probability engine 116 may include a probability module 210 that assigns a probability score for each demographic attribute with respect to each value of the content attribute. For example, the machine learning model may be a neural network having a plurality of neurons. Each neuron of the neural network may be associated with a content attribute and a demographic attribute. For each of the plurality of neurons, the probability module 210 may generate a distribution of probability scores (e.g., percentages) for the demographic attribute with respect to each value of the content attribute. The demographic attribute may be "male." The distribution of probability scores may indicate a percentage of males among the training dataset for each type of "genre." For example, the plurality of values of the content attribute may be "genre," having values of "horror," "romance," "comedy," and "action." The distribution of probability scores may indicate that 50% of content consumed by males is categorized by the content metadata as having a "genre" value of "comedy." The distribution of probability scores may indicate that 5% of content consumed by males is categorized by the content metadata as having a "genre" value of "romance." The distribution of probability scores may indicate that 30% of content consumed by males is categorized by the content metadata as having a "genre" value of "horror." Finally, the distribution of probability scores may indicate that 15% of content consumed by males is categorized by the content metadata as having a "genre" value of "action." While percentages are used herein, it is to be understood that the use of percentages is exemplary only. Other expressions/representations may be used, such as ratios, fractions, ranges, letters, a combination thereof, and/or the like.

Performance of the machine learning module 208 may be evaluated in a number of ways based on a number of true positives, false positives, true negatives, and/or false negatives classifications of the plurality of data points indicated by the machine learning model. For example, the false positives of the machine learning model may refer to a number of times the model incorrectly classified one or more demographic attributes as being strongly correlated with a content attribute. Conversely, the false negatives of the machine learning model may refer to a number of times the machine learning model classified one or more demographic attributes as being strongly correlated with a content attribute when, in fact, the one or more demographic attributes are not strongly correlated with the content attribute. True negatives and true positives may refer to a number of times the machine learning model correctly classified a demographic attribute as being or not being strongly correlated with a content attribute, respectively. Related to these measurements are the concepts of recall and precision. Generally, recall refers to a ratio of true positives to a sum of true positives and false negatives, which quantifies a sensitivity of the machine learning model. Similarly, precision refers to a ratio of true positives a sum of true and false positives.

Performance of the machine learning module 208 may be evaluated using a "log loss score." For example, the chart below shows a predicted probability distribution of viewership of a content item for a first single-user location, such as a household, referred to as Location 1 below, and a second single-user location, such as a household, referred to as Location 2 below. A multiclass log loss score, referred to as LLS below, may be determined for the first single-user location and the second single-user location in order to evaluate accuracy of the predicted probability distribution. While probabilities may be expressed as percentages herein, it is to be understood that the use of percentages is exemplary only. Other expressions/representations of probabilities may be used, such as ratios, fractions, ranges, letters, a combination thereof, and/or the like.

| Gender/Age | Viewership Probability at Location 1 | LLS for Location 1 | Viewership Probability at Location 2 | LLS for Location 2 |
|---|---|---|---|---|
| Male, 0-18 | 1% | 2.00 | 10% | 1.00 |
| Male, 18-54 | 20% | 0.70 | 35% | 0.46 |
| Male, 54+ | 39% | 0.41 | 1% | 2.00 |
| Female, 0-18 | 10% | 1.00 | 18% | 0.74 |
| Female, 18-54 | 20% | 0.70 | 35% | 0.46 |
| Female, 54+ | 10% | 1.00 | 1% | 2.00 |

It may be determined that an actual viewer at the first single-user location belongs to the Gender/Age demographic of Male, 54+(e.g., using validation data). In such a case, the log loss score may be equal to: $-\log(0.39)*1=0.41$. It may be determined that an actual viewer at the first single-user location belongs to the Gender/Age demographic of Female, 54+(e.g., using validation data). In such a case, the log loss score may be equal to: $-\log(0.1)*1=1$. A lower log loss score may be indicative of a more accurate predicted probability distribution. The machine learning module 208 may be trained and/or retrained until a determined log loss score achieves a minimum possible value.

Figure 3:
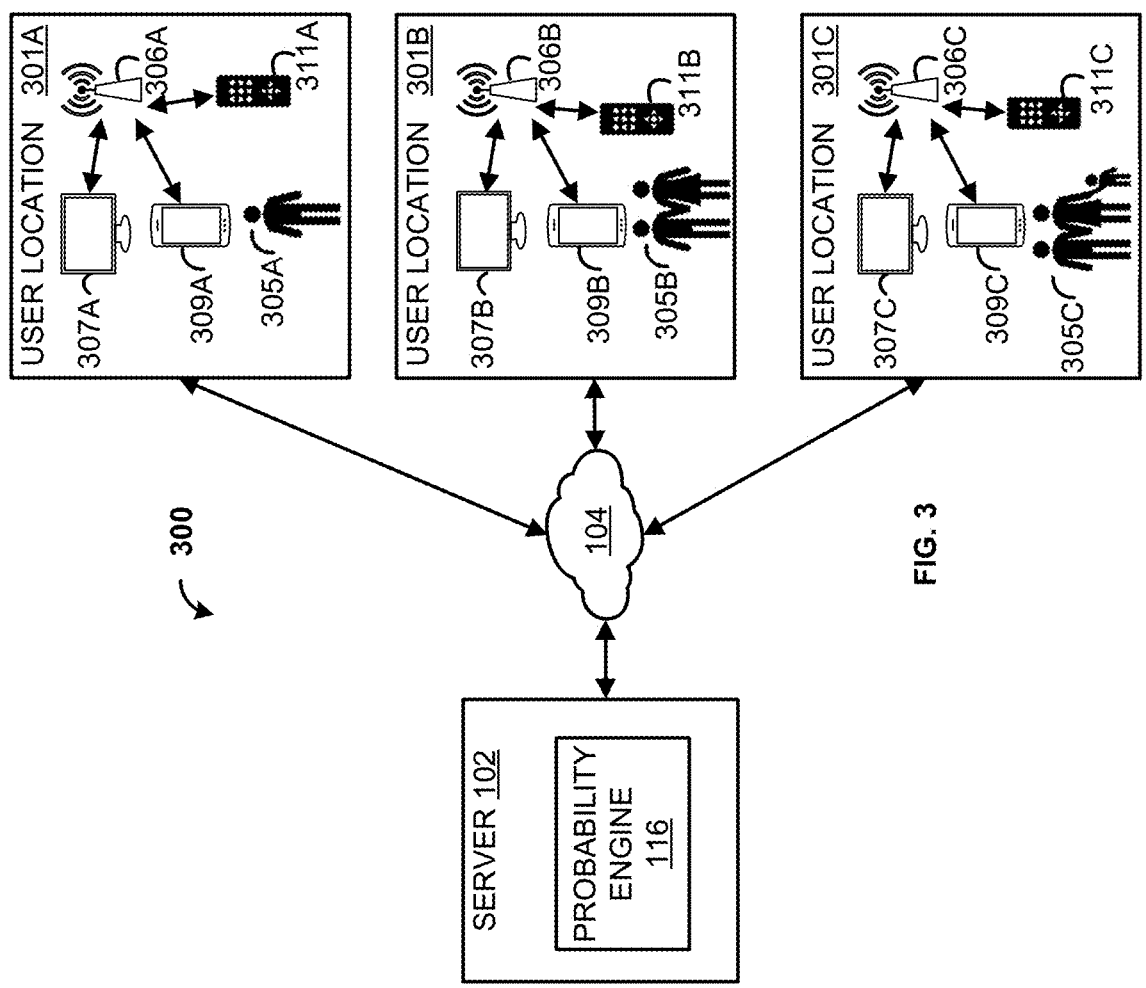
FIG. 3 shows a block diagram of an example system.

The trained machine learning model may be used by the probability engine 116 to determine which user(s) is consuming a content item among at least two users at a multi-user location at which multiple people reside. As shown in FIG. 3, the probability engine 116 may collect/aggregate demographic attributes for a plurality of user groups 305A, 305B, 305C at each of a plurality of multi-user locations 301A, 301B, 301C, such as a gender and/or an age of each user. Additionally, or in the alternative, the probability engine 116 may receive the demographic attributes for the plurality of user groups 305A, 305B, 305C from a database containing one or more of credit reporting data, census data, or survey data. The probability engine 116 may collect/aggregate content metadata for the content item being presented at the plurality of multi-user locations 301A, 301B, 301C. For example, the content item may have associated content metadata for one or more of a genre, a review score, a production year, and/or the like. Each content attribute may include a plurality of values. For example, the plurality of values for a content attribute "genre" may be "horror," "romance," "comedy," and "action." Additionally, or in the alternative, the probability engine 116 may receive the content metadata from a database containing historical viewing data for the plurality of multi-user locations 301A, 301B, 301C (e.g., billing record, set-top box data, etc.).

Figure 4:
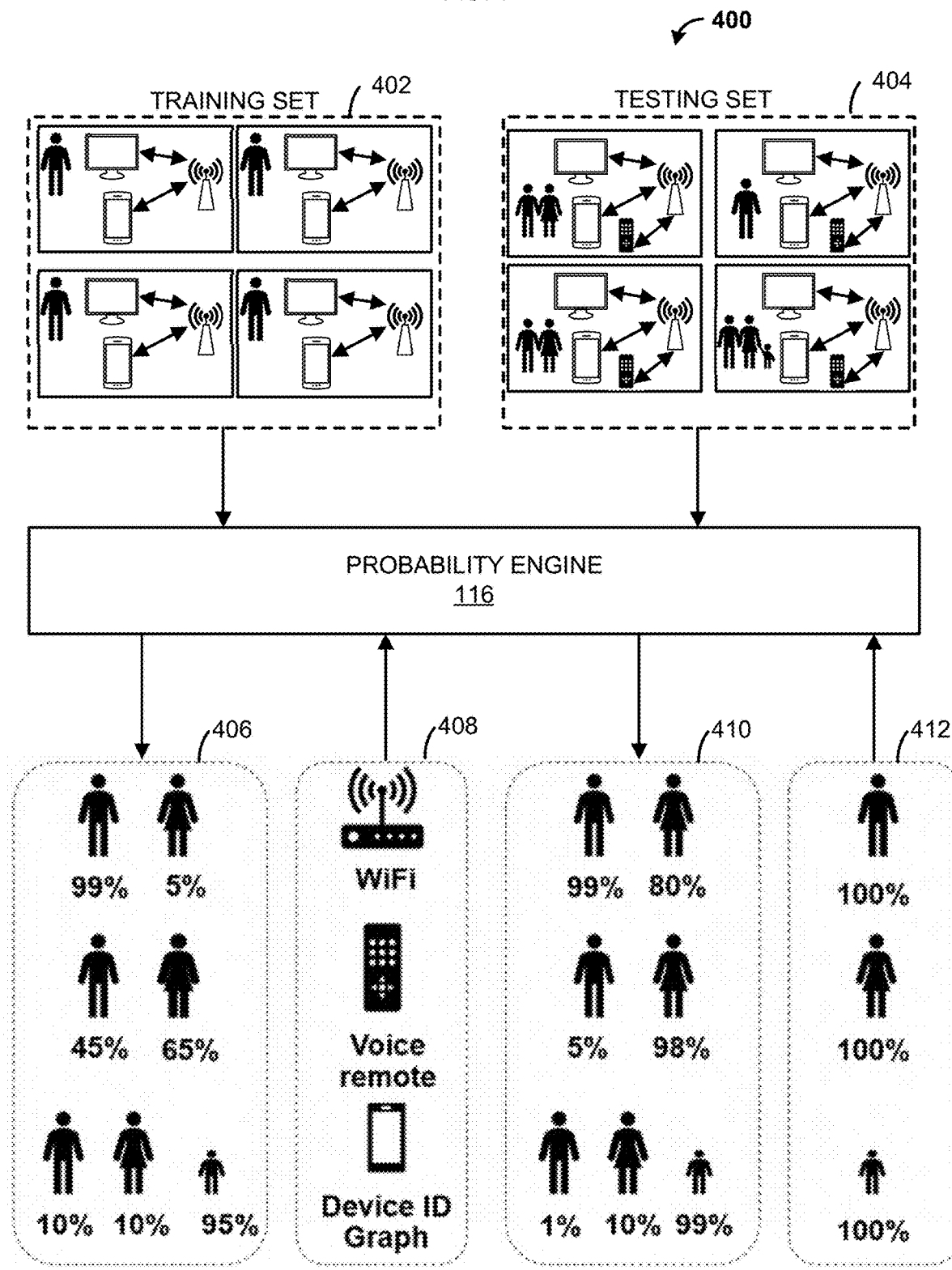
FIG. 4 shows an example training process.

Turning now to FIG. 4, an example training process 400 is shown. As discussed herein, the probability engine 116 may train a machine learning model(s) using the machine learning module 208 and a training dataset, shown in FIG. 4 as a training set 402. The training set 402 may include the demographic attributes for each user 105A, 105B, 105C. The training set 402 may also include the content metadata for each of the group of content items that were previously presented at the plurality of single-user locations 101A, 101B, 101C. The machine learning module 208 may receive the training set 402 and train the machine learning model(s) using one or more of the machine learning techniques/algorithms described herein.

Once the machine learning model(s) is trained, the machine learning module 208 may receive a testing set 404. The testing set 404 may include the demographic attributes for each user of the plurality of user groups 305A, 305B, 305C and the content metadata for the content item being presented at the plurality of multi-user locations 301A, 301B, 301C. The machine learning module 208 may apply the trained machine learning model(s) to the testing dataset 404 to generate an initial probability score for each user of the plurality of user groups 305A, 305B, 305C as shown in box 406. It should be noted that the initial probability scores for a user group may exceed 100% in the aggregate to indicate that more than one user of the user group may be consuming (e.g., viewing) the content item. For example, the initial probability scores shown in row 1 of box 406 sum to 104%, indicating a probability that both users of the user group are viewing the content item. While probabilities may be expressed as percentages herein, it is to be understood that the use of percentages is exemplary only. Other expressions/representations of probabilities may be used, such as ratios, fractions, ranges, letters, a combination thereof, and/or the like.

The probability module 210 may receive network data as shown in box 408. The network data may be associated with at least one user device 309A, 309B, 309C (e.g., laptop, mobile phone, tablet, etc.) and/or at least one voice-enabled user device 311A, 311B, 311C (e.g., a remote control, a tablet, a mobile device, etc.) at each of the plurality of multi-user locations 301A, 301B, 301C. The network data may be associated with a date/time at which the content item was consumed at each of the multi-user locations 301A, 301B, 301C. The network data may include user device wireless network data associated with the at least one user device 309A, 309B, 309C. For example, the network data may indicate a user device of at least one user of the user group 305A was logged into a wireless network (e.g., via a gateway device 306A) at the multi-user location 301A during at least a portion of time the content item was consumed.

The network data may include natural language processing data received by the at least one voice-enabled user device 311A, 311B, 311C. The voice-enabled user device 311A, 311B, 311C may be used to control a computing device 307A, 307B, 307C (e.g., set-top box, laptop, desktop, smart TV, etc.) that presents the content item (e.g., receive voice commands to control playing of the content item). For example, the natural language processing data may be indicative of a voice signature of a user at the multi-user location 301A. The network data may further include account activity data for the at least one user device 309A, 309B, 309C. For example, the account activity data may indicate a specific user account sent a request for the content item. The network data may also include data related to facial recognition. For example, a user of the at least one user device 309A, 309B, 309C may opt-in to facial recognition services offered (e.g., to customize content presented, allow access to the user device, etc.). The network data may further include interaction data associated with a user's interactions with the at least one user device 309A, 309B, 309C (e.g., responses to on-screen prompts).

The probability module 210 may use the network data to determine an adjusted probability of viewership of the content item, as shown in box 410. For example, a portion of the network data may include the account activity data. The account activity data may indicate that a user device of at least one user of the user group 305B was logged into a wireless network (e.g., via a gateway device 306B) at the multi-user location 301B during at least a portion of time the content item was consumed. The initial probability score for the at least one user of the user group 305B may be 65%, as shown in box 406, row 2. The machine learning module 208 may use the portion of the network data to determine with a higher level of confidence than initially determined that the at least one user of the user group 305B consumed the content item. Accordingly, the machine learning module 208 may use the portion of the network data to determine an adjusted probability of viewership of the content item for the at least one user of the user group 305B, as shown in box 410, row 2, indicating an adjusted probability score of 98%. When determining the adjusted probability of viewership of the content item for the user of the user group 305B, the machine learning module 208 may use Bayesian probability adjustment algorithms. For example, an apriori algorithm may be used that is based on one or more of the plurality of single-user locations 101A, 101B, 101C. The apriori algorithm and the portion of the network data may be used to adjust the probability score for the user of the user group 305B based on which demographic attributes are most predictive of viewership of the content item.

As another example, a further portion of the network data may include the natural language processing data received by the at least one voice-enabled user device 311C. The at least one voice-enabled user device 311C may be used by a user of the user group 305C to control the computing device 307C that is presenting the content item. The user of the user group 305C may speak a command to the at least one voice-enabled user device 311C, and the at least one voice-enabled user device 311C may use natural language processing techniques known in the art to identify the user of the user group 305C. The initial probability score for the user of the user group 305C may be 95%, as shown in box 406, row 3. The machine learning module 208 may use the further portion of the network data to determine with a higher level of confidence than initially determined that the user of the user group 305C consumed the content item. Accordingly, the machine learning module 208 may use the further portion of the network data to determine an adjusted probability of viewership of the content item for the user of the user group 305C, as shown in box 410, row 3, indicating an adjusted probability score of 99%. When determining the adjusted probability of viewership of the content item for the user of the user group 305C, the machine learning module 208 may use Bayesian probability adjustment algorithms. For example, an apriori algorithm may be used that is based on one or more of the plurality of single-user locations 101A, 101B, 101C. The apriori algorithm and the further portion of the network data may be used to adjust the probability score for the user of the user group 305C based on which demographic attributes are most predictive of viewership of the content item.

The machine learning module 208 may receive validation data associated with one or more users of the user groups 305A, 305B, 305C and the content item. The validation data may be determinative of which user(s) of the one or more users of the user groups 305A, 305B, 305C actually consumed the content item. For example, the validation data may be based on a survey completed by the one or more users of the user groups 305A, 305B, 305C (e.g., a consumer panel, an online survey, a telephone survey, etc.). The validation data may indicate with full confidence which user(s) of the one or more users of the user groups 305A, 305B, 305C actually consumed the content item, as shown in box 412.

The machine learning module 208 may use the adjusted probability of viewership of the content item and/or the validation data to retrain the trained machine learning model. For example, the adjusted probability of viewership of the content item and/or the validation data may be provided to the machine learning module 208, the machine learning module 208 may use the adjusted probability of viewership of the content item and/or the validation data to adjust the distribution of probability scores for "gender" with respect to each value of "genre." When adjusting the distribution of probability scores for "gender" with respect to each value of "genre," the machine learning module 208 may use Bayesian probability adjustment algorithms. For example, an apriori algorithm may be used that is based on one or more of the plurality of single-user locations 101A, 101B, 101C. The apriori algorithm and the validation data may be used to adjust the distribution of probability scores for "gender" with respect to each value of "genre" based on which demographic attributes are most predictive of viewership.

The server 102 may provide a user with user-specific secondary content based on the adjusted/validated viewing probability score. For example, the user-specific secondary content may be one or more of a content item recommendation, a commercial, a coupon, a website link, an invite to review the content item consumed, a combination thereof, and/or the like.

Figure 5:
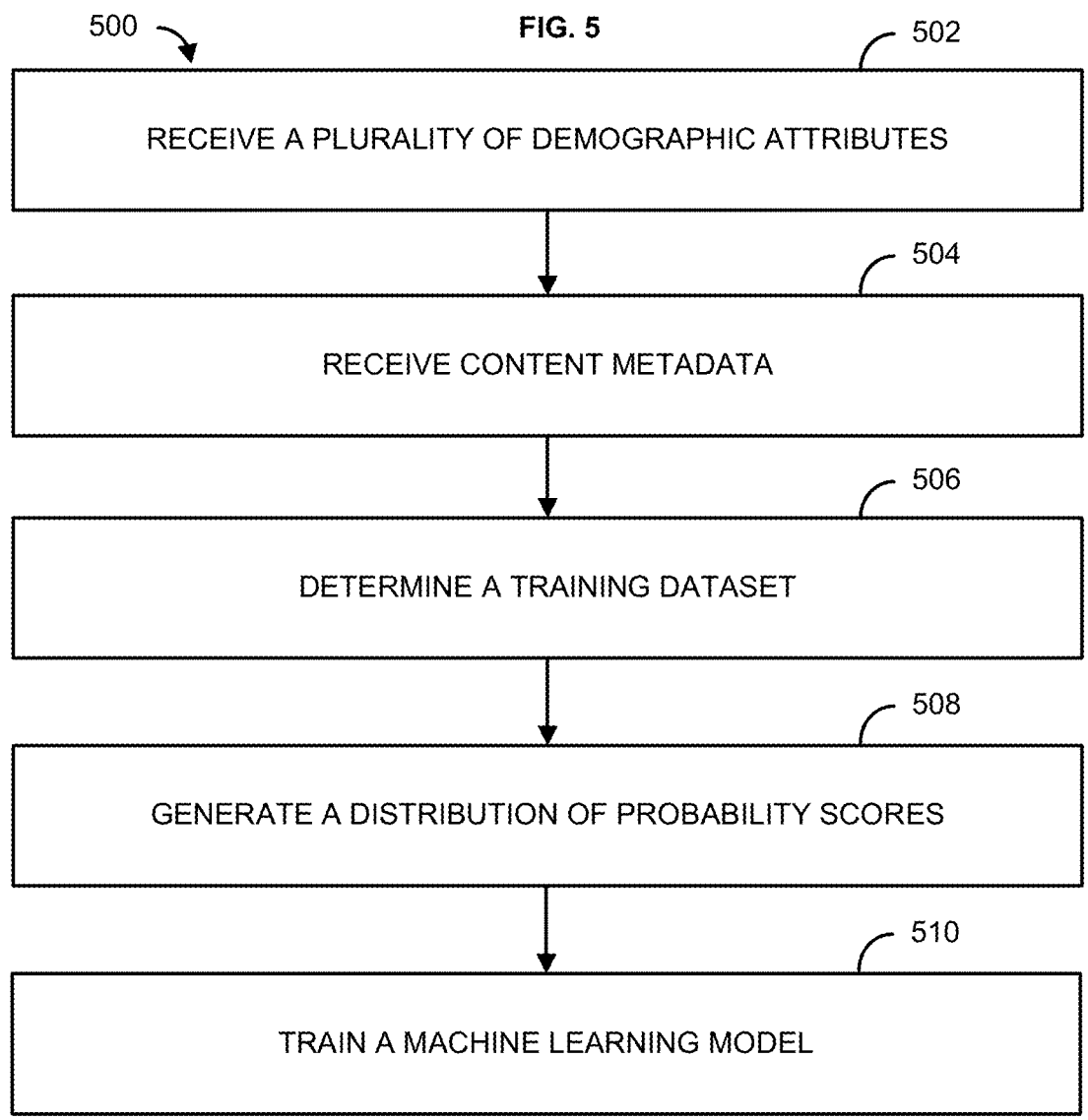
FIG. 5 shows an example method.
Figure 6:
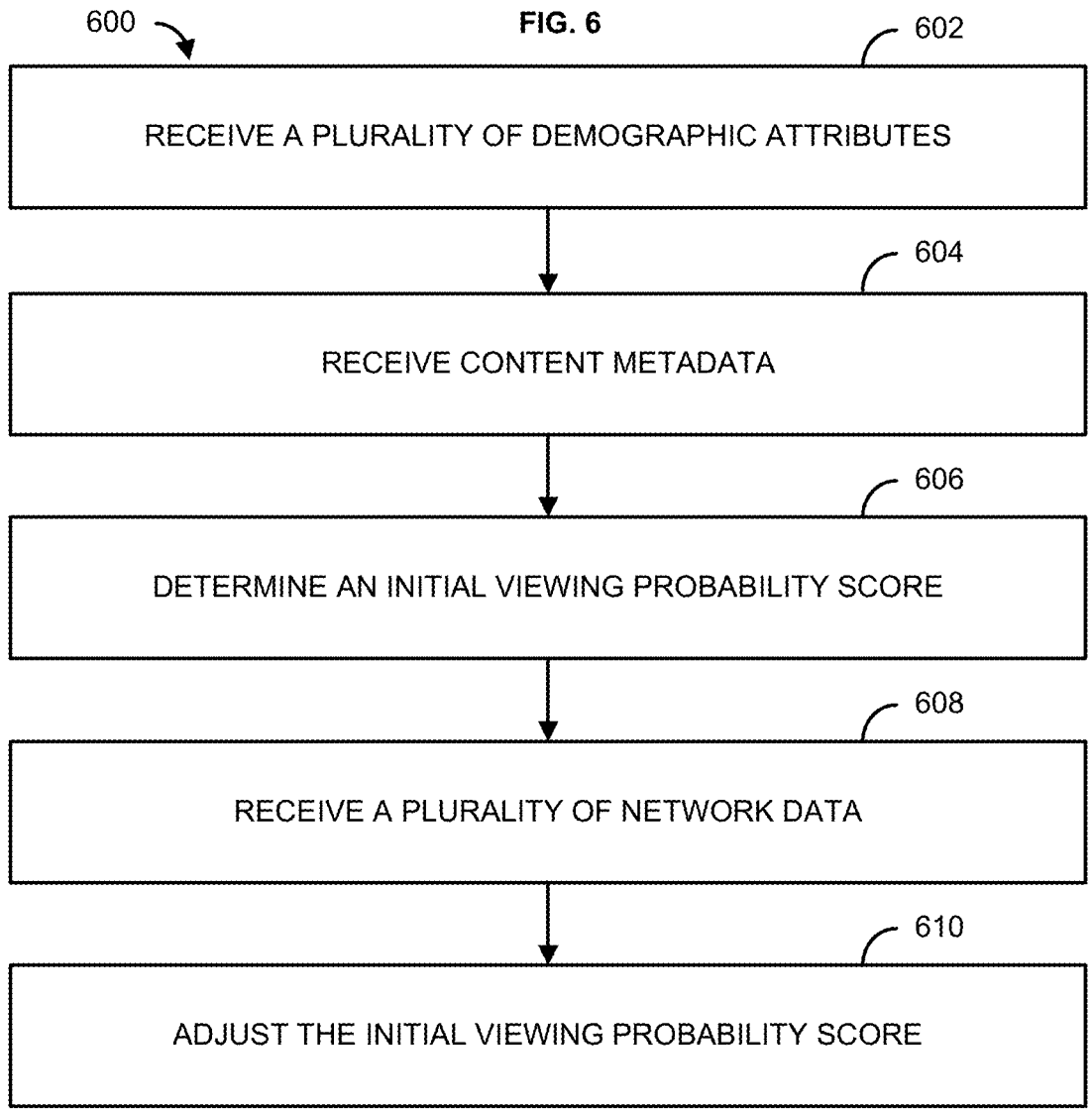
FIG. 6 shows an example method.
Figure 7:
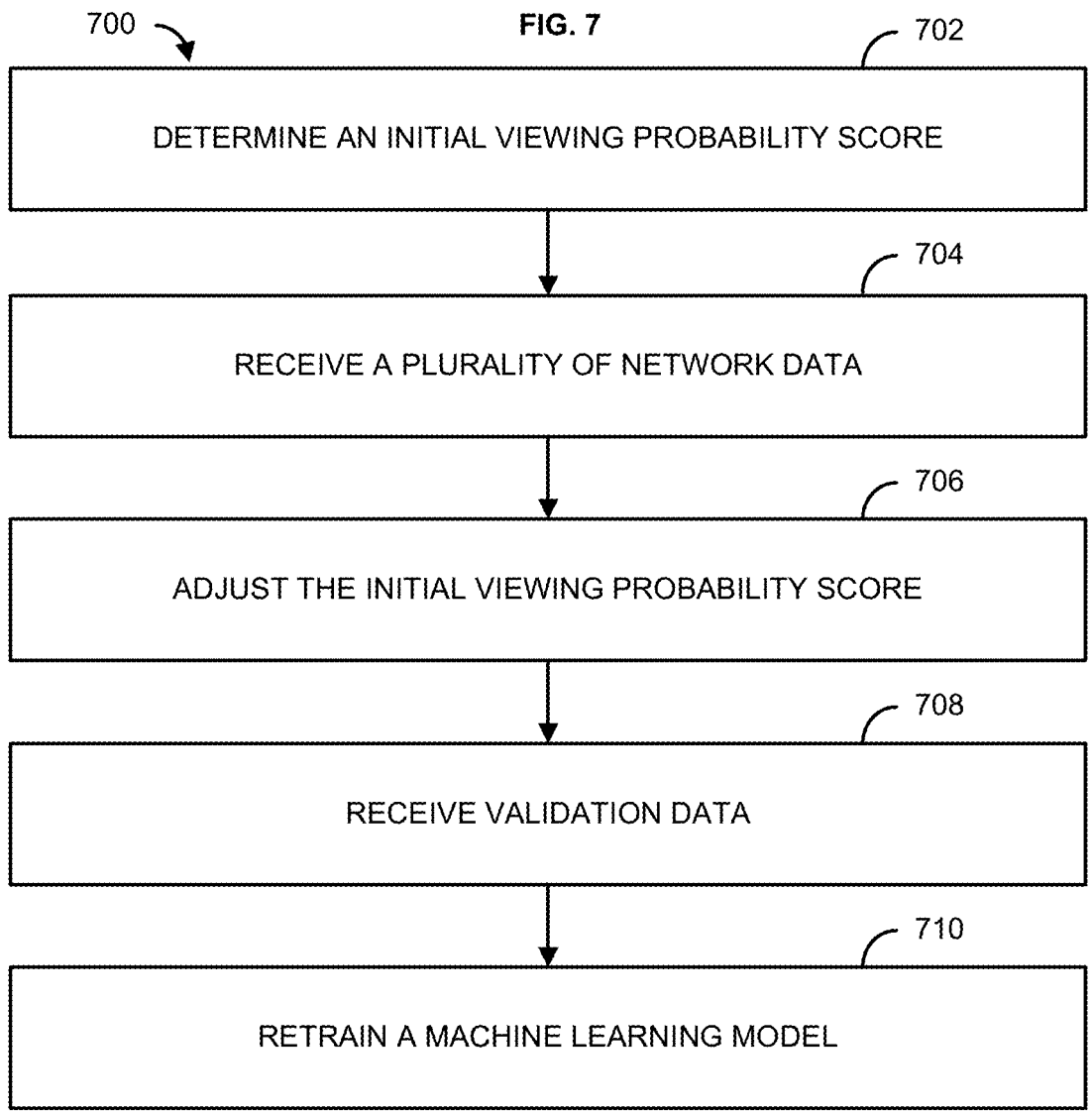
FIG. 7 shows an example method.

Turning now to FIGS. 5-7, example methods 500, 600, and 700 for determining viewership of a content item are described. The method 500 may be performed to train a machine learning model. For example, the method 500 may incorporate one or more steps of the training process 400 when training a machine learning model. The method 600 may be performed to determine a probability that a content item may be viewed by a user. For example, the method 600 may use a machine learning model that is trained according to the method 500. The method 700 may be performed to retrain a machine learning model. For example, the method 700 may use validation data to retrain a machine learning model that was previously trained according to the method 500.

Turning now to FIG. 5, a flowchart for the method 500 for determining viewership of a content item is shown. The method 500 may be performed by the probability engine 116 of FIG. 1. The server 102 or other computing device may interact with the probability engine 116 when implementing the method 500. One or more steps of the method 500 may incorporate one or more steps of the training process 400 to train a machine learning model.

At step 502, a computing device, such as the server 102, may receive a plurality of demographic attributes associated with a plurality of user locations. The plurality of user locations may be single-user locations, such as the single-user locations 101A, 101B, 101C. Each of the plurality of user locations may be associated with a single user, such as the user 105A, 105B, 105C. The plurality of demographic attributes may be associated with the users at each of the plurality of user locations. For example, the plurality of demographic attributes may include one or more of age, gender, race, religion, income, language(s) spoken, and/or the like.

At step 504, the computing device may receive content metadata associated with a plurality of content items. The plurality of content items may be content items that were previously presented at the plurality of user locations. The content metadata may include a plurality of content attributes associated with the plurality of content items. The plurality of content attributes may include, for example, a genre, a review score, a production year, a duration, and/or the like. Each content attribute may include a plurality of values. For example, the plurality of values for a content attribute "genre" may be "horror," "romance," "comedy," and "action."

At step 506, the computing device may determine a training dataset. The computing device may determine the training dataset based on the demographic attributes and the content metadata. The training dataset may include two datasets, which may each be a subset of the demographic attributes or the content metadata. A first training dataset may include a subset of the plurality of demographic attributes, and a second training dataset may include a subset of the plurality of content attributes. The first training dataset may include one or more of age or gender. The second training dataset may include one or more of a genre, a content type, a production year, a review score, or a duration. Each content attribute may include a plurality of values. For example, the plurality of values for a content attribute "genre" may be "horror," "romance," "comedy," and "action."

At step 508, the computing device may generate a distribution of probability scores. The distribution of probability scores may be generated based on the training dataset. For example, the computing device may generate the distribution of probability scores for at least one demographic attribute of the subset of the plurality of demographic attributes with respect to one or more values of at least one content attribute of the subset of the plurality of content attributes. The machine learning model may be a neural network having a plurality of neurons. Each neuron of the neural network may be associated with one demographic attribute of the first training dataset and one content attribute of the second training dataset. The computing device may generate the distribution of probability scores for each neuron of the neural network. The computing device may generate the distribution of probability scores based on the demographic attribute and the content attribute associated with the neuron. The content attribute may include a plurality of values. The distribution of probability scores may indicate a rate of occurrence (e.g., a percentage) that the demographic attribute is associated with each value of the plurality of values of the content attribute.

For example, for a given neuron, the plurality of values of the content attribute may be "genre," having values of "horror," "romance," "comedy," and "action." The demographic attribute for the given neuron may be "male." The distribution of probability scores may indicate that 50% of content consumed by males is categorized by the content metadata as having a "genre" value of "comedy." The distribution of probability scores may indicate that 5% of content consumed by males is categorized by the content metadata as having a "genre" value of "romance." The distribution of probability scores may indicate that 30% of content consumed by males is categorized by the content metadata as having a "genre" value of "horror." Finally, the distribution of probability scores may indicate that 15% of content consumed by males is categorized by the content metadata as having a "genre" value of "action." While percentages may be used herein, it is to be understood that the use of percentages is exemplary only. Other expressions/representations may be used, such as ratios, fractions, ranges, letters, a combination thereof, and/or the like.

At step 510, the computing device may train a machine learning model. The computing device may train the machine learning model using the first training dataset and/or the second training dataset. The computing device may train the machine learning model using the distribution of probability scores. The computing device may use the trained machine learning model to determine which user(s) among a user group at a multi-user location is consuming a content item. The computing device may receive a plurality of demographic attributes associated with at least two users at a multi-user location and content metadata associated with a content item being presented at the multi-user location. The multi-user location may be one of the multi-user locations 301A, 301B, or 301C. The content metadata may include a plurality of content attributes associated with the content item. The plurality of content attributes may include, for example, a genre, a review score, a production year, a duration, and/or the like. Each content attribute may include a plurality of values. For example, the plurality of values for a content attribute "genre" may be "horror," "romance," "comedy," and "action." The computing device may provide the plurality of demographic attributes and the content metadata to a probability module, such as the probability module 210.

The computing device may use the trained machine learning model to determine an initial viewing probability score for each of the at least two users. The initial viewing probability score may indicate a percentage level of confidence that each of the at least two users is consuming the content item. The initial probability score for each of the at least two users may be based on one or more of the distribution of probability scores generated.

The one or more distribution of probability scores may be selected by the probability module 210 based on a common demographic attribute shared among the user(s) associated with the one or more distribution of probability scores and one or more of the at least two users (e.g., a common gender and/or a common age group). The initial probability score for each of the at least two users may be based on the plurality of demographic attributes and the plurality of content attributes. For example, a first demographic attribute of the plurality of demographic attributes may be "male," and a first content attribute of the plurality of content attributes may be "genre" having a value of "comedy." The multi-user location may be associated with a two-person user group: one adult male viewer and one adult female viewer (e.g., the user group 305B). Based on the first demographic attribute being "male" and the first content attribute being "comedy," the initial viewing probability may indicate a confidence level of 99% that the adult male viewer is consuming the content and a 5% confidence level that the adult female viewer is consuming the content (e.g., as seen in box 406, row 1).

The computing device may receive a plurality of network data associated with the at least two users and the multi-user location. The computing device may adjust the initial viewing probability score for each of the at least two users based on the plurality of network data. As an example, the network data may be associated with the adult female viewer's user device, such as one of the user devices 309A, 309B, 309C (e.g., laptop, mobile phone, tablet, etc.). The network data may be associated with a date/time at which the content item was consumed at the multi-user location. The network data may include user device wireless network data associated with the user device (e.g., WiFi connection). The network data may indicate the user device was logged into a wireless network (e.g., via a gateway device 306A) at the multi-user location during at least a portion of time the content item was consumed. The computing device may adjust the initial viewing probability score for the adult female viewer, since the network data suggests she was more likely than not consuming the content item (e.g., as shown in box 410, row 1).

As another example, the network data may include natural language processing data received by a voice-enabled user device at the multi-user location, such as one of the voice-enabled user devices 311A, 311B, or 311C. The voice-enabled user device may be used to control a computing device (e.g., set-top box, laptop, desktop, smart TV, etc.) that is presenting the content item. For example, the voice-enabled user device may be a smart remote control that received a voice command to control presentation of the content item. The natural language processing data may be associated with the command received at the smart remote control, and it may be indicative of a voice signature of the adult female viewer at the multi-user location. The computing device may adjust the initial viewing probability score for the female, since the natural language processing data suggests she was more likely than not consuming the content item (e.g., as shown in box 410, row 1).

As another example, the network data may further include account activity data for the user device. For example, the account activity data may indicate a specific user account sent a request for the content item. The user account may be associated with the adult female viewer at the multi-user location. The computing device may adjust the initial viewing probability score for the female, since the natural language processing data suggests she was more likely than not consuming the content item (e.g., as shown in box 410, row 1). The computing device may provide the adult female viewer with user-specific secondary content based on the adjusted viewing probability score. For example, the user-specific secondary content may be one or more of a content item recommendation, a commercial, a coupon, a web site link, an invite to review the content item consumed, a combination thereof, and/or the like.

The computing device may receive validation data associated with the at least two users at the multi-user location and the content item. The validation data may be determinative of which user(s) of the at least two users actually consumed the content item. For example, the validation data may be based on a survey completed by the at least two users (e.g., a consumer panel, an online survey, a telephone survey, etc.). The validation data may indicate with full confidence that the adult male viewer actually consumed the content item but the adult female viewer did not (e.g., as shown in box 412, row 1). The computing device may use the adjusted probability of viewership of the content item (e.g., based on the network data) to retrain the trained machine learning model. The computing device may also use the validation data to retrain the trained machine learning model. For example, the adjusted probability of viewership of the content item and/or the validation data may be used by the computing device to adjust the distribution of probability scores for the demographic attribute of "gender" with respect to the value of "comedy" for the content attribute of "genre."

Turning now to FIG. 6, an example method 600 for determining viewership of a content item is shown. The method 600 may be performed by the probability engine 116 of FIG. 1. The server 102 or other computing device may interact with the probability engine 116 when implementing the method 600. One or more steps of the method 600 may incorporate one or more steps of the training process 400 to train a machine learning model.

The method 600 may be used to determine which user(s) among at least two users of a user group at a multi-user location is consuming a content item. The multi-user location may be one of the multi-user locations 301A, 301B, or 301C. At step 602, a computing device, such as the server 102, may receive a plurality of demographic attributes associated with the at least two users at the multi-user location. For example, the plurality of demographic attributes may include one or more of age, gender, race, religion, income, language(s) spoken, and/or the like.

At step 604, the computing device may receive content metadata associated with a content item being presented at the multi-user location. The content metadata may include a plurality of content attributes associated with the content item. The plurality of content attributes may include, for example, a genre, a review score, a production year, a duration, and/or the like. Each content attribute may include a plurality of values. For example, the plurality of values for a content attribute "genre" may be "horror," "romance," "comedy," and "action." The computing device may provide the plurality of demographic attributes and the content metadata to a probability module, such as the probability module 210.

At step 606, the computing device may use a trained machine learning model to determine an initial viewing probability score for each of the at least two users. The machine learning model may be trained based on a distribution of probability scores associated with a plurality of demographic attributes and a plurality of content attributes. For example, the computing device may generate the distribution of probability scores for at least one demographic attribute of a subset of the plurality of demographic attributes with respect to one or more values of at least one content attribute of a subset of the plurality of content attributes. The machine learning model may be trained using a plurality of demographic attributes associated with a plurality of single-user locations, such as the single-user locations 101A, 101B, 101C. Each of the plurality of user locations may be associated with a single user, such as the user 105A, 105B, 105C. The plurality of demographic attributes may be associated with the users at each of the plurality of user locations. The computing device may receive content metadata associated with a plurality of content items. The plurality of content items may be content items that were previously presented at the plurality of single-user locations. The content metadata may include a plurality of content attributes associated with the plurality of content items. The plurality of content attributes may include, for example, a genre, a review score, a production year, a duration, and/or the like. Each content attribute may include a plurality of values. For example, the plurality of values for a content attribute "genre" may be "horror," "romance," "comedy," and "action."

The computing device may determine a training dataset. The computing device may determine the training dataset based on the demographic attributes and the content metadata associated with the plurality of single-user locations. The training dataset may include two datasets, which may each be a subset of the demographic attributes or the content metadata associated with the plurality of single-user locations. A first training dataset may include a subset of the plurality of demographic attributes associated with the plurality of single-user locations, and a second training dataset may include a subset of the plurality of content attributes associated with the plurality of single-user locations. The first training dataset may include one or more of age or gender. The second training dataset may include one or more of a genre, a content type, a production year, a review score, or a duration. Each content attribute may include a plurality of values. For example, the plurality of values for a content attribute "genre" may be "horror," "romance," "comedy," and "action."

The computing device may train the machine learning model. The computing device may train the machine learning model using the first training dataset and/or the second training dataset. For example, the machine learning model may be a neural network having a plurality of neurons. Each neuron of the neural network may be associated with one demographic attribute of the first training dataset and one content attribute of the second training dataset. For each neuron of the neural network, the computing device may generate the distribution of probability scores. The computing device may generate the distribution of probability scores based on the demographic attribute and the content attribute associated with the neuron. The content attribute may include a plurality of values. The distribution of probability scores may indicate a rate of occurrence (e.g., a percentage) that the demographic attribute is associated with each value of the plurality of values of the content attribute.

For example, for a given neuron, the plurality of values of the content attribute may be "genre," having values of "horror," "romance," "comedy," and "action." The demographic attribute for the given neuron may be "male." The distribution of probability scores may indicate that 50% of content consumed by males is categorized by the content metadata as having a "genre" value of "comedy." The distribution of probability scores may indicate that 5% of content consumed by males is categorized by the content metadata as having a "genre" value of "romance." The distribution of probability scores may indicate that 30% of content consumed by males is categorized by the content metadata as having a "genre" value of "horror." Finally, the distribution of probability scores may indicate that 15% of content consumed by males is categorized by the content metadata as having a "genre" value of "action." While percentages may be used herein, it is to be understood that the use of percentages is exemplary only. Other expressions/representations may be used, such as ratios, fractions, ranges, letters, a combination thereof, and/or the like.

Returning to step 606, the computing device may use the trained machine learning model to determine an initial viewing probability score for each of the at least two users at the multi-user location. The initial viewing probability score may indicate a percentage level of confidence that each of the at least two users is consuming the content item. The initial probability score for each of the at least two users may be based on one or more of the distribution of probability scores generated. The one or more distribution of probability scores may be selected by the computing device based on a common demographic attribute shared among the user(s) associated with the one or more distribution of probability scores and one or more of the at least two users (e.g., a common gender and/or a common age group).

The initial viewing probability may be based on the plurality of demographic attributes and the plurality of content attributes. For example, a first demographic attribute of the plurality of demographic attributes may be "male," and a first content attribute of the plurality of content attributes may be "genre" having a value of "comedy." The multi-user location may be associated with a two-person user group: one adult male viewer and one adult female viewer (e.g., the user group 305B). Based on the first demographic attribute being "male" and the first content attribute being "comedy," the initial viewing probability may indicate a confidence level of 99% that the adult male viewer is consuming the content and a 5% confidence level that the adult female viewer is consuming the content (e.g., as seen in box 406, row 1).

At step 608, the computing device may receive a plurality of network data associated with the at least two users and the multi-user location. As an example, the network data may be associated with the adult female viewer's user device, such as one of the user devices 309A, 309B, 309C (e.g., laptop, mobile phone, tablet, etc.). The network data may be associated with a date/time at which the content item was consumed at the multi-user location. The network data may include user device wireless network data associated with the user device (e.g., WiFi connection). The network data may indicate the user device was logged into a wireless network (e.g., via a gateway device 306A) at the multi-user location during at least a portion of time the content item was consumed.

As another example, the network data may include natural language processing data received by a voice-enabled user device at the multi-user location, such as one of the voice-enabled user devices 311A, 311B, or 311C. The voice-enabled user device may be used to control a computing device (e.g., set-top box, laptop, desktop, smart TV, etc.) that is presenting the content item. For example, the voice-enabled user device may be a smart remote control that received a voice command to control presentation of the content item. The natural language processing data may be associated with the command received at the smart remote control, and it may be indicative of a voice signature of the adult female viewer at the multi-user location. As a further example, the network data may further include account activity data for the user device. For example, the account activity data may indicate a specific user account sent a request for the content item. The user account may be associated with the adult female viewer at the multi-user location.

At step 610, the computing device may adjust the initial viewing probability score for each of the at least two users based on the plurality of network data. Continuing with the above examples of network data, the computing device may adjust the initial viewing probability score for the adult female viewer, since the network data suggests she was more likely than not consuming the content item (e.g., as shown in box 410, row 1). The computing device may provide the adult female viewer with user-specific secondary content based on the adjusted viewing probability score. For example, the user-specific secondary content may be one or more of a content item recommendation, a commercial, a coupon, a website link, an invite to review the content item consumed, a combination thereof, and/or the like.

The computing device may receive validation data associated with the at least two users at the multi-user location and the content item. The validation data may be determinative of which user(s) of the at least two users actually consumed the content item. For example, the validation data may be based on a survey completed by the at least two users (e.g., a consumer panel, an online survey, a telephone survey, etc.). The validation data may indicate with full confidence that the adult male viewer actually consumed the content item but the adult female viewer did not (e.g., as shown in box 412, row 1). The computing device may use the adjusted probability of viewership of the content item (e.g., based on the network data) to retrain the trained machine learning model. The computing device may also use the validation data to retrain the trained machine learning model. For example, the adjusted probability of viewership of the content item and/or the validation data may be used by the computing device to adjust the distribution of probability scores for the demographic attribute of "gender" with respect to the value of "comedy" for the content attribute of "genre."

Turning now to FIG. 7, an example method 700 for determining viewership of a content item is shown. The method 700 may be performed by the probability engine 116 of FIG. 1. The server 102 or other computing device may interact with the probability engine 116 when implementing the method 700. One or more steps of the method 700 may incorporate one or more steps of the training process 400 to train a machine learning model.

The method 700 may be used to determine which user(s) among at least two users of a user group at a multi-user location is consuming a content item. The multi-user location may be one of the multi-user locations 301A, 301B, or 301C. A computing device, such as the server 102, may receive a plurality of demographic attributes associated with the at least two users at the multi-user location. For example, the plurality of demographic attributes may include one or more of age, gender, race, religion, income, language(s) spoken, and/or the like. The computing device may also receive content metadata associated with a content item being presented at the multi-user location. The content metadata may include a plurality of content attributes associated with the content item. The plurality of content attributes may include, for example, a genre, a review score, a production year, a duration, and/or the like. Each content attribute may include a plurality of values. For example, the plurality of values for a content attribute "genre" may be "horror," "romance," "comedy," and "action." The computing device may provide the plurality of demographic attributes and the content metadata to a probability module, such as the probability module 210.

At step 702, the computing device may use a trained machine learning model to determine an initial viewing probability score for each of the at least two users. The machine learning model may be trained based on a distribution of probability scores associated with a plurality of demographic attributes and a plurality of content attributes. For example, the computing device may generate the distribution of probability scores for at least one demographic attribute of a subset of the plurality of demographic attributes with respect to one or more values of at least one content attribute of a subset of the plurality of content attributes. The machine learning model may be trained using a plurality of demographic attributes associated with a plurality of single-user locations, such as the single-user locations 101A, 101B, 101C. Each of the plurality of user locations may be associated with a single user, such as the user 105A, 105B, 105C. The plurality of demographic attributes may be associated with the users at each of the plurality of user locations. The computing device may receive content metadata associated with a plurality of content items. The plurality of content items may be content items that were previously presented at the plurality of single-user locations. The content metadata may include a plurality of content attributes associated with the plurality of content items. The plurality of content attributes may include, for example, a genre, a review score, a production year, a duration, and/or the like. Each content attribute may include a plurality of values. For example, the plurality of values for a content attribute "genre" may be "horror," "romance," "comedy," and "action."

The computing device may determine a training dataset. The computing device may determine the training dataset based on the demographic attributes and the content metadata associated with the plurality of single-user locations. The training dataset may include two datasets, which may each be a subset of the demographic attributes or the content metadata associated with the plurality of single-user locations. A first training dataset may include a subset of the plurality of demographic attributes associated with the plurality of single-user locations, and a second training dataset may include a subset of the plurality of content attributes associated with the plurality of single-user locations. The first training dataset may include one or more of age or gender. The second training dataset may include one or more of a genre, a content type, a production year, a review score, or a duration. Each content attribute may include a plurality of values. For example, the plurality of values for a content attribute "genre" may be "horror," "romance," "comedy," and "action."

The computing device may train the machine learning model. The computing device may train the machine learning model using the first training dataset and/or the second training dataset. For example, the machine learning model may be a neural network having a plurality of neurons. Each neuron of the neural network may be associated with one demographic attribute of the first training dataset and one content attribute of the second training dataset. For each neuron of the neural network, the computing device may generate a distribution of probability scores. The computing device may generate the distribution of probability scores based on the demographic attribute and the content attribute associated with the neuron. The content attribute may include a plurality of values. The distribution of probability scores may indicate a rate of occurrence (e.g., a percentage) that the demographic attribute is associated with each value of the plurality of values of the content attribute.

For example, for a given neuron, the plurality of values of the content attribute may be "genre," having values of "horror," "romance," "comedy," and "action." The demographic attribute for the given neuron may be "male." The distribution of probability scores may indicate that 50% of content consumed by males is categorized by the content metadata as having a "genre" value of "comedy." The distribution of probability scores may indicate that 5% of content consumed by males is categorized by the content metadata as having a "genre" value of "romance." The distribution of probability scores may indicate that 30% of content consumed by males is categorized by the content metadata as having a "genre" value of "horror." Finally, the distribution of probability scores may indicate that 15% of content consumed by males is categorized by the content metadata as having a "genre" value of "action." While percentages may be used herein, it is to be understood that the use of percentages is exemplary only. Other expressions/representations may be used, such as ratios, fractions, ranges, letters, a combination thereof, and/or the like.

Returning to step 702, the computing device may use the trained machine learning model to determine an initial viewing probability score for each of the at least two users at the multi-user location. The initial viewing probability score may indicate a percentage level of confidence that each of the at least two users is consuming the content item. The initial probability score for each of the at least two users may be based on one or more of the distribution of probability scores generated. The one or more distribution of probability scores may be selected by the computing device based on a common demographic attribute shared among the user(s) associated with the one or more distribution of probability scores and one or more of the at least two users (e.g., a common gender and/or a common age group).

The initial viewing probability may be based on the plurality of demographic attributes and the plurality of content attributes. For example, a first demographic attribute of the plurality of demographic attributes may be "male," and a first content attribute of the plurality of content attributes may be "genre" having a value of "comedy." The multi-user location may be associated with a two-person user group: one adult male viewer and one adult female viewer (e.g., the user group 305B). Based on the first demographic attribute being "male" and the first content attribute being "comedy," the initial viewing probability may indicate a confidence level of 99% that the adult male viewer is consuming the content and a 5% confidence level that the adult female viewer is consuming the content (e.g., as seen in box 406, row 1).

At step 704, the computing device may receive a plurality of network data associated with the at least two users and the multi-user location. As an example, the network data may be associated with the adult female viewer's user device, such as one of the user devices 309A, 309B, 309C (e.g., laptop, mobile phone, tablet, etc.). The network data may be associated with a date/time at which the content item was consumed at the multi-user location. The network data may include user device wireless network data associated with the user device (e.g., WiFi connection). The network data may indicate the user device was logged into a wireless network (e.g., via a gateway device 306A) at the multi-user location during at least a portion of time the content item was consumed.

As another example, the network data may include natural language processing data received by a voice-enabled user device at the multi-user location, such as one of the voice-enabled user devices 311A, 311B, or 311C. The voice-enabled user device may be used to control a computing device (e.g., set-top box, laptop, desktop, smart TV, etc.) that is presenting the content item. For example, the voice-enabled user device may be a smart remote control that received a voice command to control presentation of the content item. The natural language processing data may be associated with the command received at the smart remote control, and it may be indicative of a voice signature of the adult female viewer at the multi-user location. As a further example, the network data may further include account activity data for the user device. For example, the account activity data may indicate a specific user account sent a request for the content item. The user account may be associated with the adult female viewer at the multi-user location.

At step 706, the computing device may adjust the initial viewing probability score for each of the at least two users based on the plurality of network data. Continuing with the above examples of network data, the computing device may adjust the initial viewing probability score for the adult female viewer, since the network data suggests she was more likely than not consuming the content item (e.g., as shown in box 410, row 1). The computing device may provide the adult female viewer with user-specific secondary content based on the adjusted viewing probability score. For example, the user-specific secondary content may be one or more of a content item recommendation, a commercial, a coupon, a website link, an invite to review the content item consumed, a combination thereof, and/or the like.

At step 708, the computing device may receive validation data associated with the at least two users at the multi-user location and the content item. The validation data may be determinative of which user(s) of the at least two users actually consumed the content item. For example, the validation data may be based on a survey completed by the at least two users (e.g., a consumer panel, an online survey, a telephone survey, etc.). The validation data may indicate with full confidence that the adult male viewer actually consumed the content item but the adult female viewer did not (e.g., as shown in box 412, row 1).

At step 710, the computing device may use the adjusted probability of viewership of the content item (e.g., based on the network data) and the validation data to retrain the trained machine learning model. For example, the adjusted probability of viewership of the content item and/or the validation data may be used by the computing device to adjust the distribution of probability scores for the demographic attribute of "gender" with respect to the value of "comedy" for the content attribute of "genre."

Figure 8:
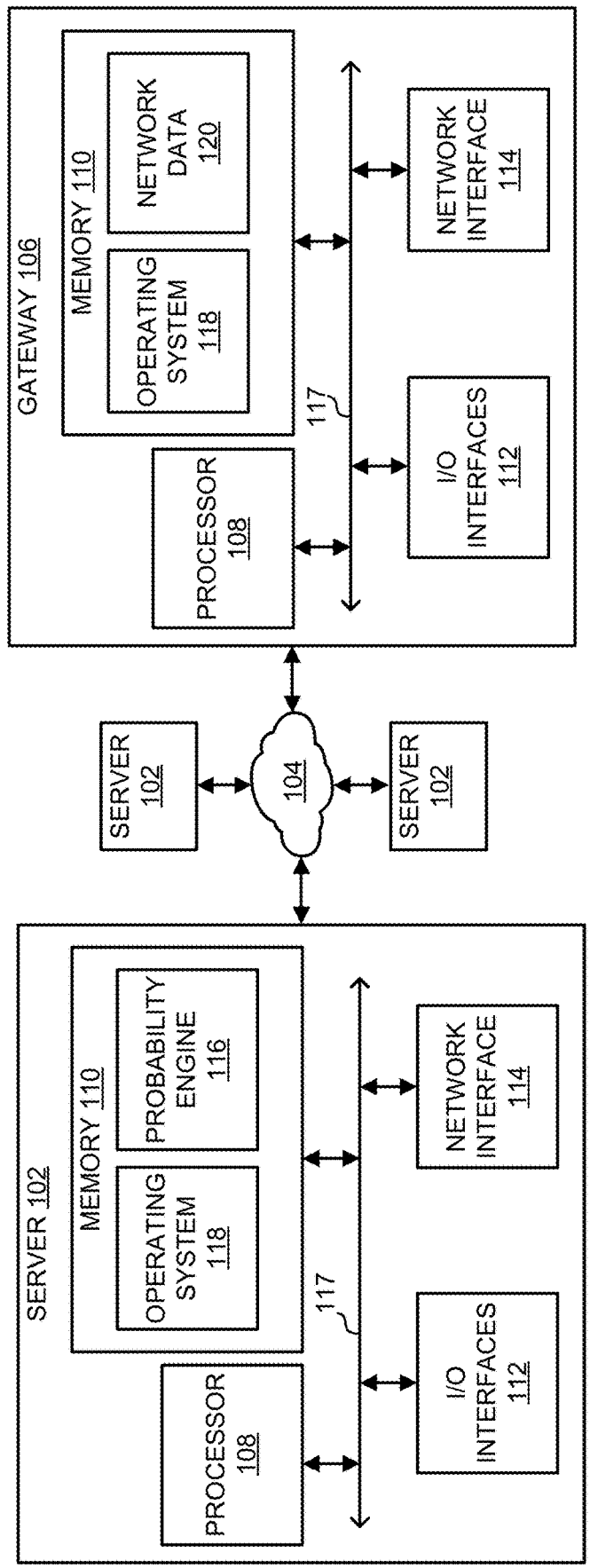
FIG. 8 shows a block diagram of an example system.

Turning now to FIG. 8, a block diagram of an example system 800 for managing network a wireless network is shown. The system 800 may include one or more of the devices/entities shown in FIG. 1 with respect to the system 100. For example, the system 800 may include the server 102 and a gateway 106, such as the gateway device 106A, 106B, or 106C, in communication via the network 104. The server 102 may include one or more computers each configured to store one or more of the probability engine 116, an operating system 118, and/or the like. The gateway 106 may include a memory 100 storing network data 120. Multiple gateways 106 may be in communication with the server(s) 102 through the network 104 such as, for example, the Internet.

The server 102 and the gateway 106 may each be a computer that, in terms of hardware architecture, may each include a processor 108, a memory 110, an input/output (I/O) interface 114, and/or a network interface 114. These may be communicatively coupled via a local interface 117. The local interface 117 may be one or more buses or other wired or wireless connections, as is known in the art. The local interface 117 may have additional elements, which are omitted for simplicity, such as controllers, buffers (caches), drivers, repeaters, and/or receivers, to enable communications. Further, the local interface 117 may include address, control, and/or data connections to enable appropriate communications among the aforementioned components.

Each processor 108 may be a hardware device for executing software, such as software stored in the corresponding memory 110. Each processor 108 may be any custom-made or commercially available processor, a central processing unit (CPU), an auxiliary processor among several processors associated with the server 102 and the gateway 106, a semiconductor-based microprocessor (in the form of a microchip or chip set), and/or generally any device for executing software instructions. When the server 102 and/or the gateway 106 are in operation, each processor 108 may be configured to execute software stored within the corresponding memory 110, to communicate data to and from the corresponding memory 110, and to generally control operations of the server 102 and/or the gateway 106 pursuant to the software.

The I/O interfaces 112 may be used to receive user input from and/or for providing system output to one or more devices or components. User input may be provided via, for example, a keyboard and/or a mouse. System output may be provided via a display device and a printer (not shown). The I/O interfaces 112 may include, for example, a serial port, a parallel port, a Small Computer System Interface (SCSI), an IR interface, an RF interface, a universal serial bus (USB) interface, and/or the like.

The network interfaces 114 may be used to transmit and receive from an external device, such as the server 102 or the gateway 106 on the network 104. The network interfaces 114 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interfaces 114 may include address, control, and/or data connections to enable appropriate communications on the network 104.

The memory 110 may include any one or combination of volatile memory elements (e.g., random access memory (RAM, such as DRAM, SRAM, SDRAM, etc.)) and non-volatile memory elements (e.g., ROM, hard drive, tape, CDROM, DVDROM, etc.). Moreover, the memory system 110 may incorporate electronic, magnetic, optical, and/or other types of storage media. Note that the memory system 110 may have a distributed architecture, where various components are situated remote from one another, but may be accessed by the processor 108.

The software stored the in memory 110 may include one or more software programs, each of which may include an ordered listing of executable instructions for implementing logical functions. For example, as shown in FIG. 8, the software in the memory 110 of the server 102 may include the probability engine 116 and the operating system (O/S) 118. As also shown in FIG. 8, the software in the memory 110 of the gateway 106 may include the network data 120 and the operating system (O/S) 118. Each operating system 118 may control execution of other computer programs, such as the probability engine 116 of the server 102. Each operating system 118 may provide scheduling, input-output control, file and data management, memory management, and/or communication control and related services.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
receiving, by a computing device, a plurality of demographic attributes associated with a plurality of user locations;
receiving content metadata associated with a plurality of content items presented at the plurality of user locations, wherein the content metadata comprises a plurality of content attributes associated with the plurality of content items;
determining, based on the plurality of demographic attributes associated with the plurality of user locations and the content metadata, a training dataset comprising the plurality of demographic attributes associated with the plurality of user locations and the plurality of content attributes;
generating, based on the training dataset, a distribution of probability scores for one or more demographic attributes of the plurality of demographic attributes associated with the plurality of user locations with respect to one or more values of one or more content attributes of the plurality of content attributes;
training, based on the distribution of probability scores, a machine learning model;
determining, by the trained machine learning model and based on a plurality of demographic attributes associated with at least two users at a user location and content metadata for a content item output at the user location, an initial viewing probability score for each of the at least two users; and
adjusting, based on a plurality of network data associated with the at least two users, the initial viewing probability score for each of the at least two users.

2. The method of claim 1, wherein each of the plurality of user locations is associated with a single user.

3. The method of claim 1, wherein the machine learning model is a neural network comprising a plurality of neurons.

4. The method of claim 3, wherein each neuron is associated with one content attribute of the plurality of content attributes and one demographic attribute of the plurality of demographic attributes associated with the plurality of user locations.

5. The method of claim 1, wherein the plurality of demographic attributes associated with the plurality of user locations comprises one or more of age or gender, and wherein the plurality of content attributes comprises one or more of a genre, a content type, a production year, a review score, or a duration.

6. The method of claim 1, further comprising:
adjusting, based the user location, the initial viewing probability score for each of the at least two users.

7. The method of claim 1, further comprising:
receiving, by the computing device, validation data associated with the at least two users and the user location; and
retraining the trained machine learning model based on the validation data.

8. A method comprising:
receiving, by a computing device, a plurality of demographic attributes associated with at least two users at a user location;
receiving content metadata associated with a content item being presented at the user location, wherein the content metadata comprises a plurality of content attributes;
determining, by a trained machine learning model based on the plurality of demographic attributes and the plurality of content attributes, an initial viewing probability score for each of the at least two users, wherein the trained machine learning model is trained based on a distribution of probability scores associated with the plurality of demographic attributes and the plurality of content attributes;
receiving a plurality of network data associated with the at least two users and the user location; and
adjusting, based on the plurality of network data, the initial viewing probability score for each of the at least two users.

9. The method of claim 8, further comprising:
retraining the trained machine learning model based on the adjusted initial viewing probability score for each of the at least two users.

10. The method of claim 8, wherein the plurality of network data comprises one or more of user device wireless network data associated with one of the at least two users, natural language processing data received at a user device associated with one of the at least two users, or account activity data for the user device associated with one of the at least two users.

11. The method of claim 8, further comprising:
receiving, by the computing device, validation data associated with the at least two users and the user location, wherein the validation data indicates whether each of the at least two users viewed the content item.

12. The method of claim 11, further comprising:
retraining the trained machine learning model based on the validation data associated with the at least two users and the user location.

13. The method of claim 8, wherein the trained machine learning model is trained by:
determining, based on a received plurality of demographic attributes associated with a plurality of user locations and received content metadata, comprising another plurality of content attributes associated with a plurality of content items presented at the plurality of user locations, a training dataset comprising a subset of the received plurality of demographic attributes and a subset of the another plurality of content attributes; and
training a machine learning model using the training dataset.

14. The method of claim 13, wherein the machine learning model is a neural network comprising a plurality of neurons, and wherein training the machine learning model using the training dataset comprises, for each of the plurality of neurons:
generating, based on a demographic attribute of the subset of the received plurality of demographic attributes and a content attribute of the subset of the plurality of content attributes, the distribution of probability scores for the demographic attribute with respect to each value of the content attribute.

15. A method comprising:
   determining, by a trained machine learning model, based on:
      a plurality of demographic attributes associated with at least two users at a user location, and
      content metadata associated with a content item being presented at the user location, wherein the content metadata comprises a plurality of content attributes,
      an initial viewing probability score for each of the at least two users, wherein the trained machine learning model is trained based on a distribution of probability scores associated with the plurality of demographic attributes and the plurality of content attributes;
   receiving a plurality of network data associated with the at least two users and the user location;
   adjusting, based on the plurality of network data, the initial viewing probability score for each of the at least two users;
   receiving, by a computing device, validation data associated with the at least two users and the user location; and
   retraining the trained machine learning model based on the adjusted initial viewing probability score and the validation data.

16. The method of claim 15, wherein the plurality of network data comprises one or more of user device wireless network data associated with one of the at least two users, natural language processing data received at a user device associated with one of the at least two users, or account activity data for the user device associated with one of the at least two users.

17. The method of claim 15, wherein the validation data indicates whether each of the at least two users viewed the content item.

18. The method of claim 15, wherein the trained machine learning model is trained by:
   determining, based on a received plurality of demographic attributes associated with a plurality of user locations and received content metadata, comprising another plurality of content attributes associated with a plurality of content items presented at the plurality of user locations, a training dataset comprising a subset of the received plurality of demographic attributes and a subset of the another plurality of content attributes; and
   training a machine learning model using the training dataset.

19. The method of claim 18, wherein the machine learning model is a neural network comprising a plurality of neurons, wherein each neuron is associated with one content attribute of the subset of the plurality of content attributes and one demographic attribute of the subset of the received plurality of demographic attributes.

20. The method of claim 19, wherein training the machine learning model using the training dataset comprises, for each of the plurality of neurons:
   generating, based on the one demographic attribute and the one content attribute, the distribution of probability scores for the one demographic attribute with respect to each value of the one content attribute.

* * * * *